US012659153B2

(12) United States Patent
Panikkar

(10) Patent No.: US 12,659,153 B2
(45) Date of Patent: Jun. 16, 2026

(54) CONFIGURATION-AWARE FUNCTIONALITY ENABLEMENT IN INFORMATION PROCESSING SYSTEM ENVIRONMENT

(71) Applicant: Dell Products L.P., Round Rock, TX (US)

(72) Inventor: Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 18/144,450

(22) Filed: May 8, 2023

(65) Prior Publication Data

US 2024/0380590 A1     Nov. 14, 2024

(51) Int. Cl.
*H04L 9/30* (2006.01)
*G06F 21/60* (2013.01)

(52) U.S. Cl.
CPC .......... *H04L 9/3073* (2013.01); *G06F 21/602* (2013.01)

(58) Field of Classification Search
CPC .............................. H04L 9/3073; G06F 21/602
See application file for complete search history.

(56) References Cited

U.S. PATENT DOCUMENTS

| | | | |
|---|---|---|---|
| 7,603,318 | B1 | 10/2009 | Colosso et al. |
| 11,210,372 | B2 | 12/2021 | Savanah et al. |
| 11,294,991 | B2 | 4/2022 | Savanah et al. |
| 11,449,581 | B2 | 9/2022 | Kapoor et al. |
| 11,526,585 | B2 | 12/2022 | Panikkar et al. |
| 2004/0039916 | A1* | 2/2004 | Aldis .................... G06F 21/105 |
| | | | 713/177 |
| 2007/0107067 | A1* | 5/2007 | Fountain ................... G06F 8/60 |
| | | | 726/33 |
| 2008/0228513 | A1 | 9/2008 | McMillan et al. |
| 2009/0119779 | A1 | 5/2009 | Dean et al. |
| 2015/0227723 | A1* | 8/2015 | Tylik ....................... G06F 16/22 |
| | | | 726/26 |
| 2017/0134161 | A1 | 5/2017 | Goeringer et al. |
| 2017/0206523 | A1 | 7/2017 | Goeringer et al. |
| 2017/0221029 | A1 | 8/2017 | Lund et al. |
| 2017/0300668 | A1* | 10/2017 | Bawa .................... G06F 21/629 |
| 2018/0203992 | A1 | 7/2018 | Kilpatrick |
| 2018/0240165 | A1 | 8/2018 | Kilpatrick |
| 2019/0303543 | A1 | 10/2019 | Savanah et al. |
| 2020/0074046 | A1 | 3/2020 | Raley et al. |
| 2020/0257775 | A1 | 8/2020 | Wright et al. |

(Continued)

OTHER PUBLICATIONS

D. Ferrante, "Licensing Models: What's Out There?" IT Professional, vol. 8, No. 601, Nov. 2006, pp. 24-29.

(Continued)

*Primary Examiner* — Rupal Dharia
*Assistant Examiner* — Raghavender Cholleti
(74) *Attorney, Agent, or Firm* — Ryan, Mason & Lewis, LLP

(57) ABSTRACT

Intelligent functionality enablement techniques are disclosed. In one example, a method comprises obtaining a functionality enablement file comprising at least a first block and a second block, wherein the first block is usable to activate one or more features of a product and the second block is usable to perform a configuration setup to enable the product to operate in accordance with at least one computing platform.

20 Claims, 8 Drawing Sheets

100

(56)　　　　　　References Cited

U.S. PATENT DOCUMENTS

| | | |
|---|---|---|
| 2021/0073211 A1 | 3/2021 | Wright, Sr. |
| 2021/0073407 A1 | 3/2021 | Yu et al. |
| 2021/0248210 A1 | 8/2021 | Panikkar et al. |
| 2022/0171831 A1* | 6/2022 | Hiratsuka .............. H04L 9/0643 |
| 2022/0200791 A1* | 6/2022 | Le Roux ............... H04L 9/0894 |
| 2023/0104292 A1 | 4/2023 | Panikkar et al. |

OTHER PUBLICATIONS

LABS64, "Net Licensing," https://netlicensing.io/licensing-models/, Accessed May 5, 2023, 8 pages.
Wikipedia, "Software License," https://en.wikipedia.org/wiki/Software_license, Apr. 26, 2023, 8 pages.
Wikipedia, "Floating Licensing," https://en.wikipedia.org/wiki/Floating_licensing, Sep. 14, 2022, 1 page.
Wikipedia, "License Manager," https://en.wikipedia.org/wiki/License_manager, Jan. 30, 2023, 2 pages.

* cited by examiner

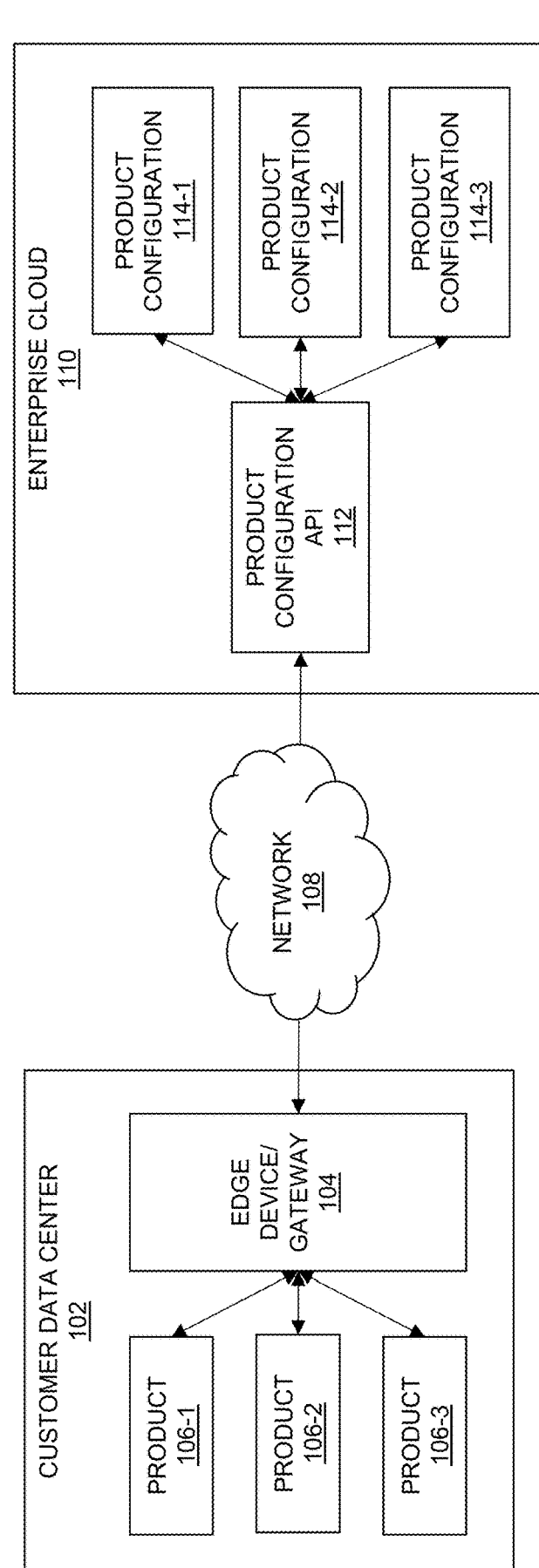
FIG. 1

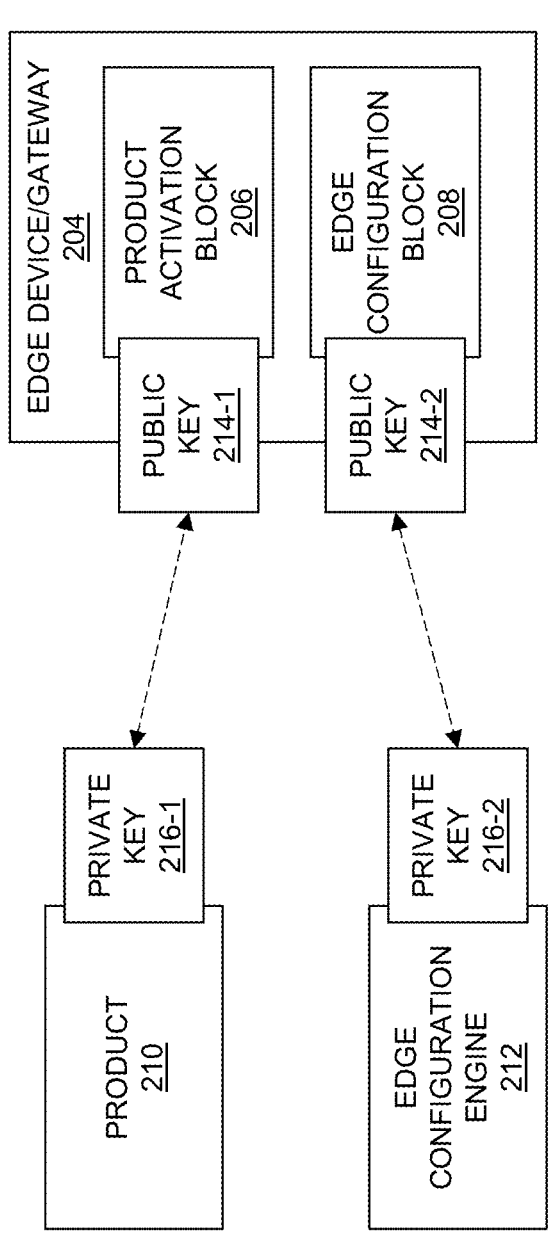
FIG. 2

400

402

404

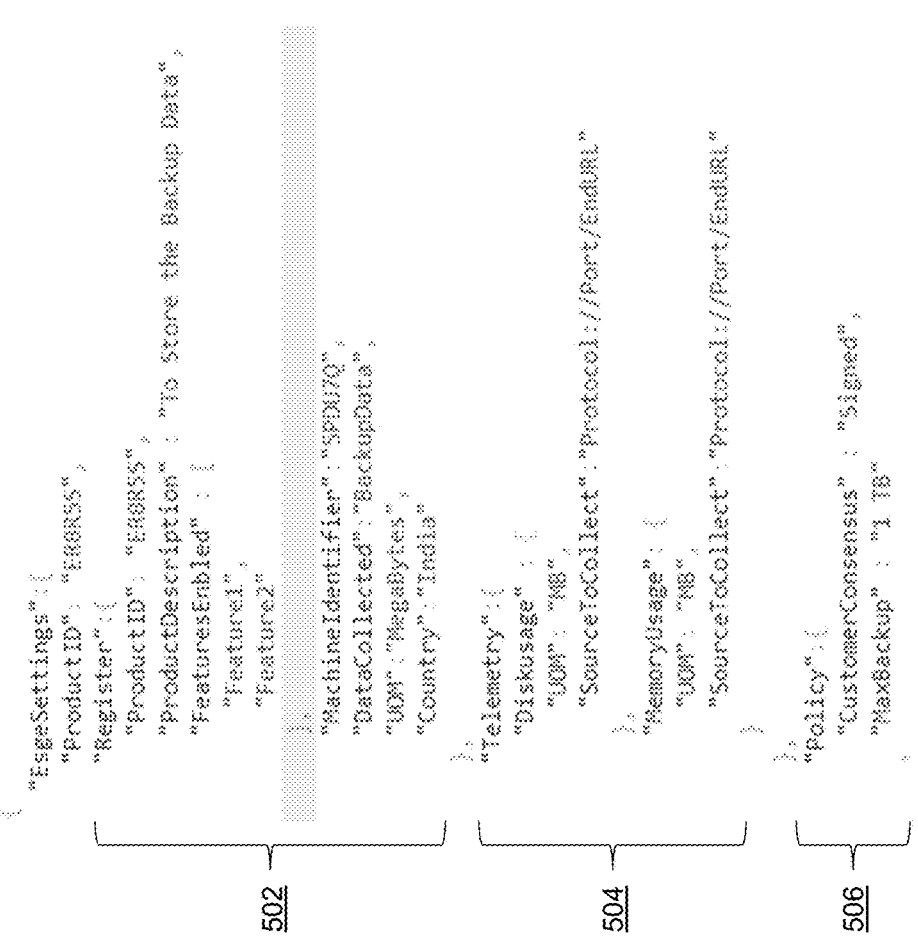
FIG. 5

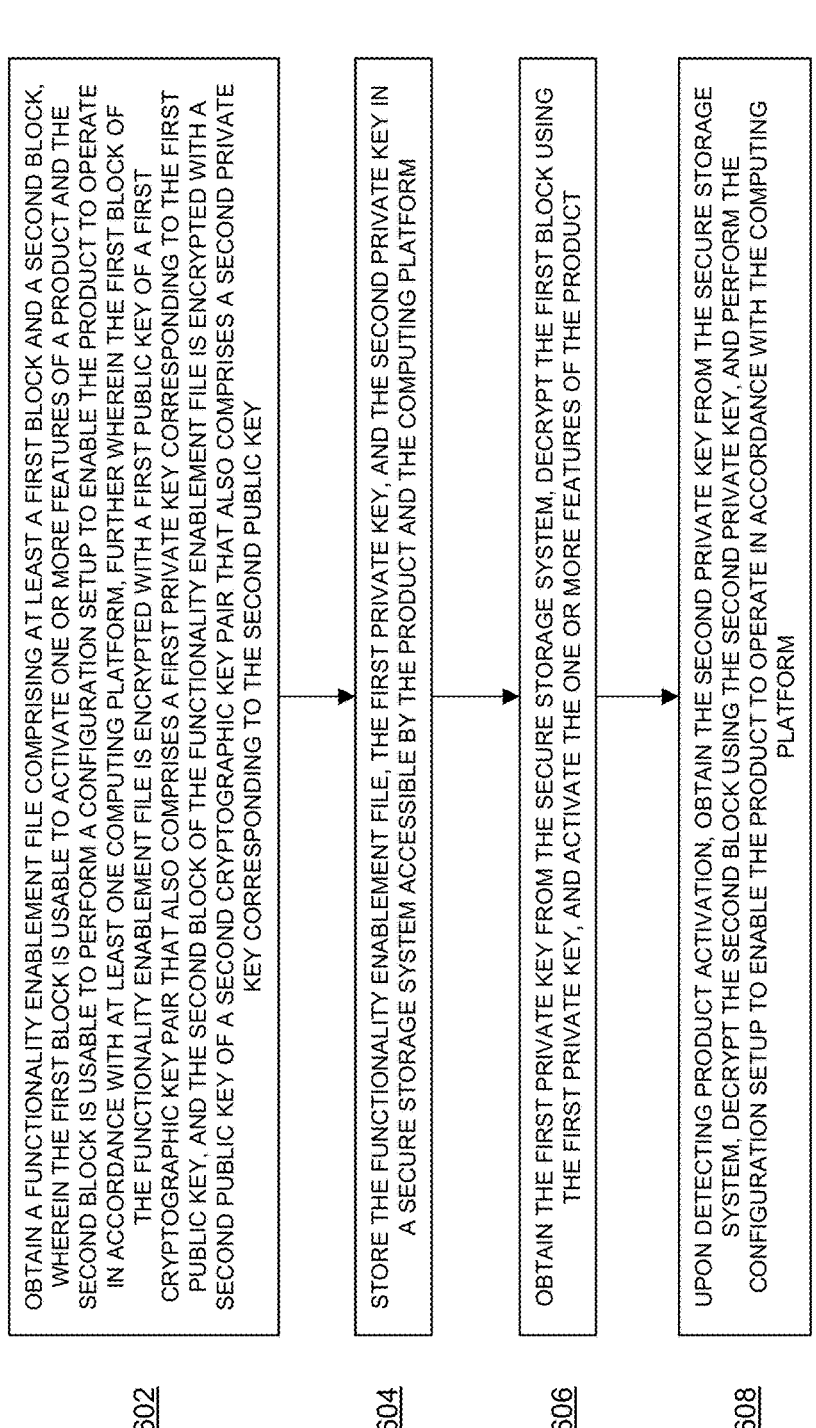

600

602 OBTAIN A FUNCTIONALITY ENABLEMENT FILE COMPRISING AT LEAST A FIRST BLOCK AND A SECOND BLOCK, WHEREIN THE FIRST BLOCK IS USABLE TO ACTIVATE ONE OR MORE FEATURES OF A PRODUCT AND THE SECOND BLOCK IS USABLE TO PERFORM A CONFIGURATION SETUP TO ENABLE THE PRODUCT TO OPERATE IN ACCORDANCE WITH AT LEAST ONE COMPUTING PLATFORM, FURTHER WHEREIN THE FIRST BLOCK OF THE FUNCTIONALITY ENABLEMENT FILE IS ENCRYPTED WITH A FIRST PUBLIC KEY OF A FIRST CRYPTOGRAPHIC KEY PAIR THAT ALSO COMPRISES A FIRST PRIVATE KEY CORRESPONDING TO THE FIRST PUBLIC KEY, AND THE SECOND BLOCK OF THE FUNCTIONALITY ENABLEMENT FILE IS ENCRYPTED WITH A SECOND PUBLIC KEY OF A SECOND CRYPTOGRAPHIC KEY PAIR THAT ALSO COMPRISES A SECOND PRIVATE KEY CORRESPONDING TO THE SECOND PUBLIC KEY

604 STORE THE FUNCTIONALITY ENABLEMENT FILE, THE FIRST PRIVATE KEY, AND THE SECOND PRIVATE KEY IN A SECURE STORAGE SYSTEM ACCESSIBLE BY THE PRODUCT AND THE COMPUTING PLATFORM

606 OBTAIN THE FIRST PRIVATE KEY FROM THE SECURE STORAGE SYSTEM, DECRYPT THE FIRST BLOCK USING THE FIRST PRIVATE KEY, AND ACTIVATE THE ONE OR MORE FEATURES OF THE PRODUCT

608 UPON DETECTING PRODUCT ACTIVATION, OBTAIN THE SECOND PRIVATE KEY FROM THE SECURE STORAGE SYSTEM, DECRYPT THE SECOND BLOCK USING THE SECOND PRIVATE KEY, AND PERFORM THE CONFIGURATION SETUP TO ENABLE THE PRODUCT TO OPERATE IN ACCORDANCE WITH THE COMPUTING PLATFORM

FIG. 6

CONFIGURATION-AWARE FUNCTIONALITY ENABLEMENT IN INFORMATION PROCESSING SYSTEM ENVIRONMENT

FIELD

The field relates generally to information processing systems, and more particularly to techniques for enabling functionalities on processing devices deployable as part of such information processing systems.

BACKGROUND

Enterprises often configure their information processing system environments to include one or more centralized computing networks (e.g., one or more cloud computing networks) and one or more distributed computing networks (e.g., one or more edge computing networks). As such, enterprises are continuing to shift much of the execution of their business logic to the edge computing networks and, when needed/desired, sending data from the edge computing networks to the cloud computing networks to perform additional capabilities.

As more business logic is executed in edge computing networks, the complexity of configuring an edge computing network is increasing. Previously, configuration of products (e.g., hardware, software, or combinations thereof) associated with edge devices or gateways (e.g., processing devices that operate with one or more products as part of an edge computing network) was a one-time effort. However, each edge device product that an enterprise ships to a customer (especially, in a subscription model of edge device usage) typically demands some changes in the configuration or setup.

In one setup approach, a representative of the enterprise goes to the customer location and sets up the edge device product. However, with increasing dependency of edge computing networks, manually assisted setup is becoming unproductive and time consuming, causing customers to have to wait for completion of the setup before being able to use the edge device product for which they have already paid.

In another setup approach, referred to as no-touch setup, an enterprise provides a commonly configured edge device product to each customer and uses an executable software agent to remotely perform the customer-specific configuration. For example, when the edge device product powers on for the first time at the customer location, the software agent awakens and contacts the enterprise online via a communication network (e.g., internet and/or wireless network) to obtain the setup and configuration needed in the edge device product. However, if online access is not available at the customer location, no-touch setup is not possible and thus manual setup is still required.

SUMMARY

Illustrative embodiments provide intelligent functionality enablement techniques in an information processing system environment.

For example, in one or more illustrative embodiments, a method comprises obtaining a functionality enablement file comprising at least a first block and a second block, wherein the first block is usable to activate one or more features of a product and the second block is usable to perform a configuration setup to enable the product to operate in accordance with at least one computing platform.

In some illustrative embodiments, the first block of the functionality enablement file is encrypted with a first public key of a first cryptographic key pair that also comprises a first private key corresponding to the first public key, and the second block of the functionality enablement file is encrypted with a second public key of a second cryptographic key pair that also comprises a second private key corresponding to the second public key.

In some illustrative embodiments, the method may store the functionality enablement file, the first private key, and the second private key in a secure storage system accessible by the product and the computing platform.

In some illustrative embodiments, the method may obtain the first private key from the secure storage system, decrypt the first block using the first private key, and activate the one or more features of the product. Upon detecting product activation, the method may obtain the second private key from the secure storage system, decrypt the second block using the second private key, and perform the configuration setup to enable the product to operate in accordance with the computing platform.

Advantageously, inter alia, illustrative embodiments overcome drawbacks that arise when there is a need/desire to enable functionalities associated with a processing device in an information processing system environment (e.g., an edge computing platform) that has limited or no online access and/or a need/desire to avoid an agent-driven activation and configuration approach.

These and other illustrative embodiments include, without limitation, methods, apparatus, networks, systems and processor-readable storage media.

BRIEF DESCRIPTION OF THE DRAWINGS

FIG. 1 illustrates an edge computing network environment with agent-driven configuration setup.

FIG. 2 illustrates bifurcated functionality enablement in accordance with a processing device deployed in an edge computing network environment according to an illustrative embodiment.

FIG. 5 illustrates an instruction set associated with an edge configuration block according to an illustrative embodiment.

FIG. 6 shows a methodology for bifurcated functionality enablement in accordance with a processing device deployed in an information processing system environment according to an illustrative embodiment.

DETAILED DESCRIPTION

Figure 3:
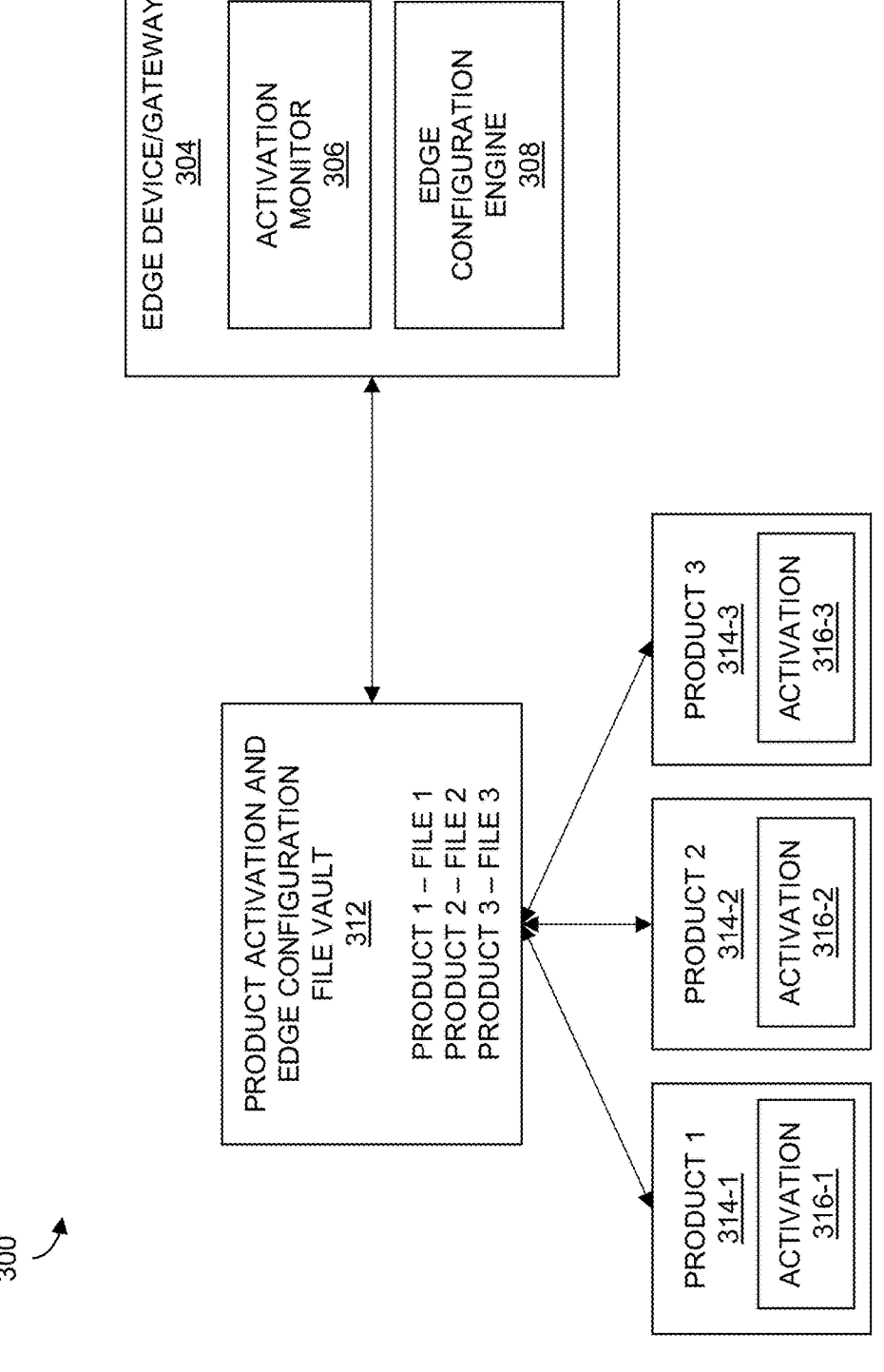
FIG. 3 illustrates an exemplary architecture for bifurcated functionality enablement in accordance with a processing device deployed in an edge computing network environment according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown.

Accordingly, the term "information processing system" as used herein is intended to be broadly construed, so as to encompass, for example, processing systems comprising cloud and edge computing and storage systems, as well as other types of processing systems comprising various combinations of physical and virtual processing resources.

In existing usage, a key is used to activate a product and its features that the customer purchased or otherwise subscribed to. The key, also known as a product key or an activation key, is typically a set of data (e.g., numbers and letters) that allows a product provider to certify that the copy of the product, for which the key has been offered, is original. For example, according to the product feature the customer buys/subscribes to, the key is generated at the enterprise side, and then the ordered product is shipped to the customer side. The key is copied to a specific product folder at the customer side. The product then reads the key and activates the one or more features in the product, consistent with the key.

Furthermore, assuming some configuration setup has to be performed for the product, as mentioned above, an existing no-touch setup uses an agent-driven approach to perform the setup. FIG. 1 illustrates an edge computing network environment 100 with an agent-driven configuration setup. As shown, a customer data center 102 comprises an edge device/gateway 104 which is operatively coupled to a plurality of products 106-1, 106-2, and 106-3 (collectively referred to herein as products 106 or individually as product 106). Edge device/gateway 104 is also operatively coupled, via a network 108, to an enterprise cloud 110. The enterprise associated with enterprise cloud 110 is assumed to be the entity that provided one or more of products 106 (e.g., manufacturer, vendor, etc.) or that is otherwise responsible for configuration setup of the one or more products 106. As further shown, enterprise cloud 110 comprises a product configuration application programming interface (API) 112 and a plurality of product configurations 114-1, 114-2, and 114-3 (collectively referred to herein as product configurations 114 or individually as product configuration 114), respectively corresponding to the plurality of products 106-1, 106-2, and 106-3.

It realized herein that the edge configuration of each product 106 may be different. By way of example only, product 106-1 may need to be configured with maximum backup functionality as well as some optionally configurable product features. Further, product 106-1 may need to be configured to send warning and/or error alerts to the enterprise, as well as have policy and usage settings that need to be configured. Product 116-2 can then have completely different configuration needs (e.g., requirements to report memory consumption, enforce customer consensus for data share to cloud, display billing information, enable add-on requests from edge device/gateway 104, etc.). In fact, some edge products may have over 20 different available setups.

It is further assumed that a software agent (not expressly shown) shipped inside each of products 106 calls enterprise cloud 110, via product configuration API 112, which obtains the corresponding product configuration 114 for each product 106. The product configuration 114 is provided to and installed at edge device/gateway 104 to enable the setup for each product 106. As such, it is realized herein that each product 106 must store and execute the software agent and must be tightly coupled for configuration to edge device/gateway 104. If there are any changes to be made in the configuration, product 106 then needs to be patched. Moreover, in a scenario where customer data center 102 does not allow an internet connection (i.e., network 108) such as with a so-called dark site, the agent-driven approach in FIG. 1 will not work. As such, the enterprise must fall back to one or more in-person site visits and manual configuration of each product 106.

Illustrative embodiments overcome the above and other drawbacks with the agent-driven approach of FIG. 1 by using a bifurcated functionality enablement process that, inter alia, eliminates or otherwise mitigates edge configuration dependency with respect to the edge products. More particularly, illustrative embodiments provide methodologies and systems for configuring functionality enablement using two blocks: (i) one block to activate product features as explained above; and (ii) another block for edge product configuration. In at least some illustrative embodiments, the two blocks are encrypted using different pairs of cryptographic keys (i.e., via public key cryptography), wherein each key pair generated comprises a private key and a corresponding public key. One private key of one key pair is for the product (e.g., to read the product features to be activated) and another private key of another key pair is for the edge functionalities (e.g., to read the edge configuration section). More particularly, the corresponding public keys are used to, respectively, encrypt the product feature block and the edge configuration block. Then, accordingly, the private key for the product feature block is accessible to decrypt the product activation block, while the private key for the edge configuration block is accessible to decrypt the edge configuration block.

In some illustrative embodiments, the edge configuration block can have a generic standard structure that any edge device can access and read. In some embodiments, rather than copying the edge configuration block into a product folder, the new edge configuration block is copied into a common shared folder, accessible to only the product and the edge device/gateway.

More particularly, FIG. 2 illustrates bifurcated functionality enablement 200 in accordance with a processing device deployed in an edge computing network environment according to an illustrative embodiment. As shown, in a customer data center, an edge device/gateway 204 comprises a product activation block 206 and an edge configuration block 208. In some embodiments, product activation block 206 is configured, in an existing manner, with license content (e.g., activation key) for activating the features for a product 210, while edge configuration block 208 is configured to enable an edge configuration engine 212 to perform the needed/desired edge configuration setup for product 210. Note that as illustratively used herein, "bifurcated functionality enablement" collectively refers to both product activation (e.g., effected by product activation block 206) and edge configuration setup (e.g., effected by edge configuration block 208).

As mentioned above, in the FIG. 2 embodiment, product activation block 206 is encrypted via a public key 214-1 of a key pair that also comprises a corresponding private key 216-1, while edge configuration block 208 is encrypted via a public key 214-2 of a key pair that also comprises a corresponding private key 216-2. Then, in accordance with public key cryptography techniques, private key 216-1 is used to decrypt product activation block 206, while private key 216-2 is used to decrypt edge configuration block 208.

FIG. 3 illustrates an exemplary architecture 300 for implementing bifurcated functionality enablement 200 according to an illustrative embodiment. As shown, an edge device/gateway 304 comprises modules including an activation monitor 306 and an edge configuration engine 308. Further, as shown, a product activation and edge configuration file vault (or more simply hereinafter, file vault) 312 is operatively coupled to edge device/gateway 304 and to products 314-1, 314-2, and 314-3 (collectively referred to herein as products 314 or individually as product 314). Also, as shown, products 314-1, 314-2, and 314-3 have respective activation modules 316-1, 316-2, and 316-3.

In this non-limiting example, it is assumed that file vault 312 comprises a separate file containing a product activation block 206 and an edge configuration block 208 for each product 314, e.g., Product 1 (product 314-1)—File 1, Product 2 (product 314-2)—File 2, Product 3 (product 314-3)—File 3. Each product activation block 206 associated with a given one of products 314 is assumed to be encrypted with a public key (e.g., 214-1 in FIG. 2) uniquely assigned thereto. Similarly, each edge configuration block 208 is assumed to be encrypted with a public key (e.g., 214-2 in FIG. 2) uniquely assigned thereto. Additionally, file vault 312 comprises the corresponding private keys for product activation block 206 (e.g., 216-1 in FIG. 2) and an edge configuration block 208 (e.g., 216-2 in FIG. 2) for each product 314. File vault 312 is considered a secure storage structure (e.g., secure common folder) commonly accessible by each product 314 and edge device/gateway 304, as will be further explained. Access to file vault 312 by each product 314 and edge device/gateway 304 can be protected by one or more existing authentication/authorization security protocols.

In operation, assume that a given one of products 314 is installed in a customer data center. When product 314 first starts (boots), it obtains the product activation block private key (216-1) for that product from file vault 312. Activation module 316 for product 314 then decrypts and reads product activation block 206 for product 314 from file vault 312. Activation module 316 then activates product features specified in activation block 206. Note that while FIG. 3 illustrates each product 314 having a separate activation module 316, in alternative embodiments, at least one activation module 316 can be configured to activate multiple products 314 such that each product 314 does not necessarily have to include an activation module 316. Also, in some other embodiments, an activation module 316 can be implemented at the customer location but remote from products 314.

Activation monitor 306 in edge device/gateway 304 actively monitors for any newly activated product (or reactivated existing product following a change) as evidenced by activation activity in file vault 312. Upon detecting an activation of the given product 314 mentioned above, activation monitor 306 notifies edge configuration engine 308. Edge configuration engine 308 obtains the edge configuration block private key (216-2) for the given product 314 from file vault 312, and then decrypts and reads edge configuration block 208 for product 314 from file vault 312. Edge configuration engine 308 then follows the instructions in edge configuration block 208 to configure the edge setup for product 314.

Figure 4:
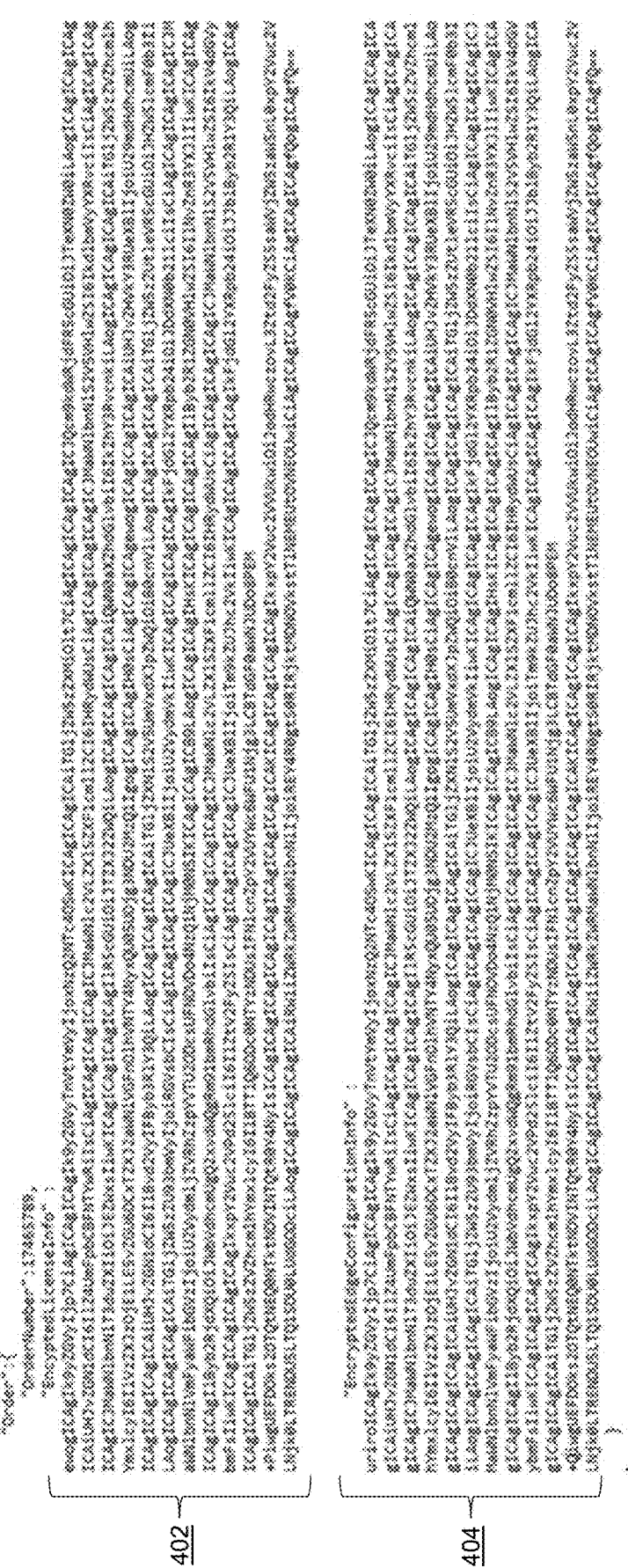
FIG. 4 illustrates a bifurcated functionality enablement file according to an illustrative embodiment.

FIG. 4 illustrates a bifurcated functionality enablement file 400 according to an illustrative embodiment. More particularly, bifurcated functionality enablement file 400 is an encrypted example of a file stored in file vault 312 for a given product 314 with block 402 representing product activation block 206 and block 404 representing edge configuration block 208. In one illustrative embodiment, block 402 can comprise the content of a standard file structure that is presently used to activate a software product in accordance with a software license, while block 404 can comprise configuration instructions for setting up the product to operate in the edge computing platform in which it is deployed. It is to be appreciated that edge configuration engine 308 can be configured to read instructions from edge configuration blocks associated with products from one or more product providers. FIG. 5 illustrates an instruction set 500 associated with an edge configuration block according to an illustrative embodiment.

In one non-limiting use case, the following sequence of steps can be executed:

1. Product is built in the provider's factory or software organization.

2. Implement activation module 316 in the product to read a product activation block and enable a variety of features for product.

3. Customer orders feature 1 and feature 2 of the product in provider's sales tool.

4. Activation module 316 generates product activation block 206 to enable features 1 and 2.

5. Generate key pair value for product activation block 206 and use public key 214-1 to encrypt product activation block 206 with a product identifier (ID) as a parameter. Recall that block 402 in FIG. 4 is one example of an encrypted product activation block 206.

6. Edge configuration engine 308 generates the edge configuration block 208 for a product with the following configuration functionalities:

(i) Product ID is "ER8R55".

(ii) Product needs to register with features and other details.

(iii) Telemetry configuration needs to be done with details of the collection.

(iv) Customer consensus to be checked.

(v) Maximum data backup required is 1 TB.

Recall that block 404 in FIG. 4 is one example of an encrypted edge configuration block 208. For example, the edge configuration for each feature is templatized and on run time, block 404 is generated.

7. Generate key pair value for edge configuration block 208 and use public key 214-2 to encrypt edge configuration block 208 with the product identifier (ID) as a parameter.

8. Combine the encrypted product activation block 402 and the encrypted edge configuration block 404 to create a new file for storage in file vault 312 for the product. In one non-limiting example, the file may be referred to as an edge configuration license file.

9. Ship the product to customer location.

10. Instruct customer to download the software needed for the product.

11. Instruct customer to download edge configuration license file and private keys for product and edge configuration engine 308, and store edge configuration license file and private keys on file vault 312.

12. Activation monitor 306 listens for change in file vault 312 (i.e., new file has been added).

13. Edge configuration engine 308 obtains the private key for the new product.

14. Edge configuration engine 308 decrypts the encrypted edge configuration block 404.

15. Edge configuration engine 308 is configured such that it understands the structure of the decrypted edge configuration block 208. Edge configuration engine 308 reads the file and obtains a first action as "Register" (a file portion 502 in FIG. 5) to obtain all details needed for that action under the "Register" tag. Edge configuration engine 308 then reads the attributes in the JSON (JavaScript Object Notation) and registers the product in the edge computing platform.

16. Edge configuration engine 308 then reads the next action as "Telemetry" (a file portion 504 in FIG. 5) and uses the attributes under that action to configure for telemetry.

17. Edge configuration engine 308 then reads the last action as "Policy" (a file portion 506 in FIG. 5) and uses the attributes under that action to set the customer consensus and policy to restrict the max backup.

Advantageously, illustrative embodiments provide for a bifurcated functionality enablement to activate a product and set up the edge configuration. Among many advantages, illustrative embodiments provide a methodology of automated edge configuration for customers operating with data centers for which internet is not accessible to the processing devices (e.g., edge servers) of the data center.

FIG. 6 shows a methodology 600 for bifurcated functionality enablement in accordance with a processing device deployed in an information processing system environment according to an illustrative embodiment.

Step 602 obtains a functionality enablement file comprising at least a first block and a second block, wherein the first block is usable to activate one or more features of a product and the second block is usable to perform a configuration setup to enable the product to operate in accordance with at least one computing platform. The first block of the functionality enablement file is encrypted with a first public key of a first cryptographic key pair that also comprises a first private key corresponding to the first public key, and the second block of the functionality enablement file is encrypted with a second public key of a second cryptographic key pair that also comprises a second private key corresponding to the second public key.

Step 604 stores the functionality enablement file, the first private key, and the second private key in a secure storage system accessible by the product and the computing platform.

Step 606 obtains the first private key from the secure storage system, decrypts the first block using the first private key, and activates the one or more features of the product.

Step 608, upon detecting product activation in step 606, obtains the second private key from the secure storage system, decrypts the second block using the second private key, and performs the configuration setup to enable the product to operate in accordance with the computing platform.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for secure component verification will now be described in greater detail with reference to FIGS. 7 and 8. Although described in the context of information processing system environment mentioned herein, these platforms may also be used to implement at least portions of other information processing systems in other embodiments.

Figure 7:
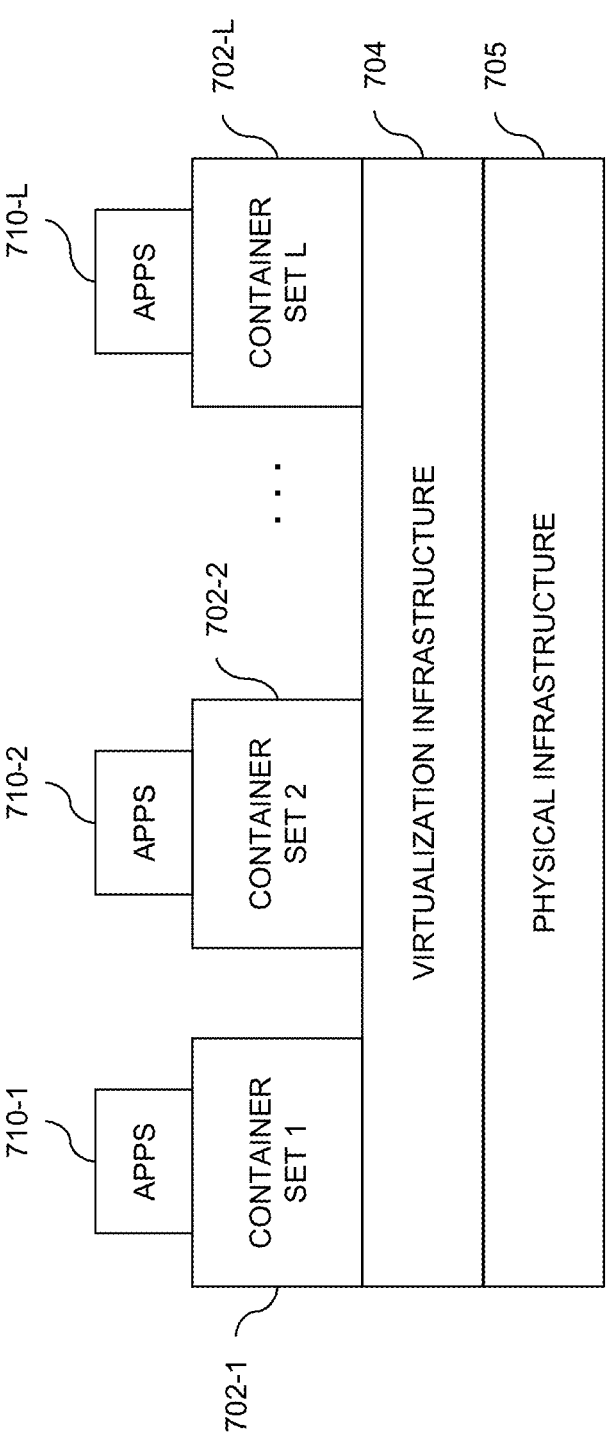
FIGS. 7 and 8 illustrate examples of processing platforms that may be utilized to implement at least a portion of an information processing system in illustrative embodiments.
Figure 8:
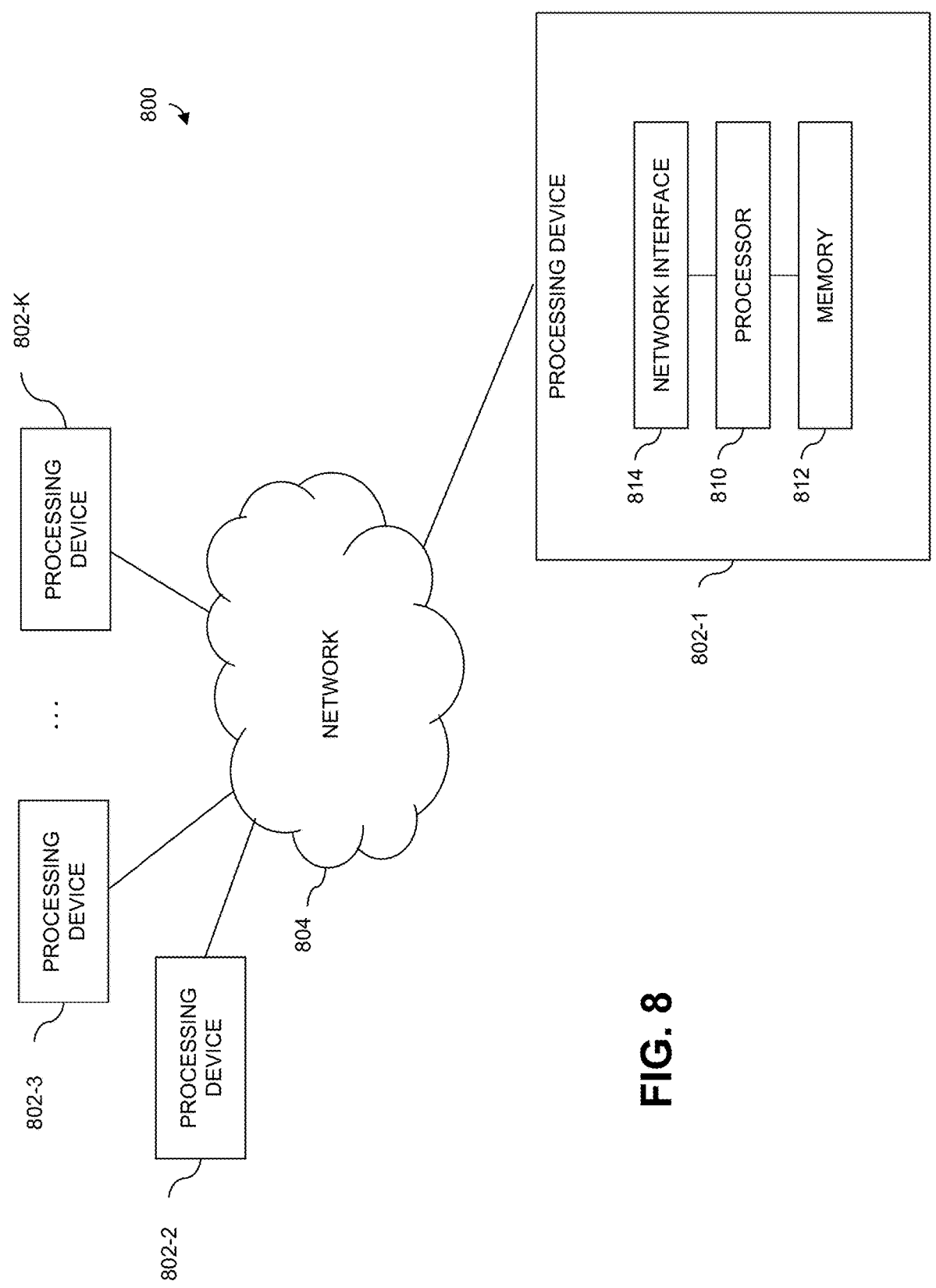

FIG. 7 shows an example processing platform comprising infrastructure 700. Infrastructure 700 comprises a combination of physical and virtual processing resources that may be utilized to implement at least a portion of the information processing system environment 100 in FIG. 1. Infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

Infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environments mentioned herein may each run on a computer, server, storage device or other processing platform element. A given such element may be viewed as an example of what is more generally referred to herein as a "processing device." Infrastructure 700 shown in FIG. 7 may represent at least a portion of one processing platform. Another example of such a processing platform is processing platform 800 shown in FIG. 8.

The processing platform 800 in this embodiment comprises at least a portion of information processing system environment 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and information processing system environments mentioned herein may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for application monitoring with predictive anomaly detection and fault isolation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    storing, in a secure storage system, a functionality enablement file comprising at least a first block and a second block, wherein the first block is configured to activate one or more features of a product based on a user selection of the one or more features of the product, and wherein the second block is configured to perform a configuration setup to enable the product to operate in accordance with a first computing platform based on a product identity of the product, the selected one or more features of the product, configuration criteria of the product, configuration criteria of the selected one or more features of the product, and operational data criteria for the configuration setup;

sending, from the secure storage system to the product, the first block for activation of the selected one or more features of the product; and in response to detection of the activation of the selected one or more features of the product, sending, from the secure storage system to a device of a second computing platform, the second block to perform the configuration setup of the product by the device;

wherein the first computing platform is a cloud computing platform managed by a provider of the product and the second computing platform is an edge computing platform coupled to the product and to the cloud computing platform, and further wherein the product lacks access to the first computing platform.

2. The method of claim 1, wherein:

the first block of the functionality enablement file is encrypted with a first public key of a first cryptographic key pair that also comprises a first private key corresponding to the first public key; and the second block of the functionality enablement file is encrypted with a second public key of a second cryptographic key pair that also comprises a second private key corresponding to the second public key.

3. The method of claim 2, further comprising:

storing, the first private key, and the second private key in the secure storage system accessible by the product and the device, respectively.

4. The method of claim 3, further comprising:

obtaining, by the product, the first private key from the secure storage system;

decrypting, by the product, the first block using the first private key; and activating, by the product, the one or more features of the product.

5. The method of claim 4, further comprising:

obtaining, by the device, the second private key from the secure storage system;

decrypting, by the device, the second block using the second private key; and performing, by the device, the configuration setup to enable the product to operate in accordance with the first computing platform.

6. The method of claim 5, wherein obtaining the second private key, decrypting the second block using the second private key, and performing the configuration setup to enable the product to operate in accordance with the first computing platform are performed following detection that the one or more features of the product have been activated.

7. The method of claim 1, wherein the first block comprises product activation-related data.

8. The method of claim 1, wherein the second block comprises a set of one or more configuration instructions for setting up the product to operate in accordance with the first computing platform.

9. The method of claim 1, wherein the product and the device of the second computing platform reside at a data center of a customer that obtained the product from the provider of the product.

10. An apparatus comprising:

at least one processing platform comprising at least one processor coupled to at least one memory, the at least one processing platform, when executing program code, is configured to:

store, in a secure storage system, a functionality enablement file comprising at least a first block and a second block, wherein the first block is configured to activate one or more features of a product based on a user selection of the one or more features of the product, and wherein the second block is configured to perform a configuration setup to enable the product to operate in accordance with a first computing platform based on a product identity of the product, the selected one or more features of the product, configuration criteria of the product, configuration criteria of the selected one or more features of the product, and operational data criteria for the configuration setup;

send, from the secure storage system to the product, the first block for activation of the selected one or more features of the product; and in response to detection of the activation of the selected one or more features of the product, send, from the secure storage system to a device of a second computing platform, the second block to perform the configuration setup of the product by the device;

wherein the first computing platform is a cloud computing platform managed by a provider of the product and the second computing platform is an edge computing platform coupled to the product and to the cloud computing platform, and further wherein the product lacks access to the first computing platform.

11. The apparatus of claim 10, wherein:

the first block of the functionality enablement file is encrypted with a first public key of a first cryptographic key pair that also comprises a first private key corresponding to the first public key; and the second block of the functionality enablement file is encrypted with a second public key of a second cryptographic key pair that also comprises a second private key corresponding to the second public key.

12. The apparatus of claim 11, wherein the at least one processing platform, when executing the program code, is further configured to cause storage of the first private key, and the second private key in the secure storage system accessible by the product and the device, respectively.

13. The apparatus of claim 12, wherein the at least one processing platform, when executing the program code, is further configured to:

obtain, by the product, the first private key from the secure storage system;

decrypt, by the product, the first block using the first private key; and activate, by the product, the one or more features of the product.

14. The apparatus of claim 13, wherein the at least one processing platform, when executing the program code, is further configured to:

obtain, by the device, the second private key from the secure storage system;

decrypt, by the device, the second block using the second private key; and perform, by the device, the configuration setup to enable the product to operate in accordance with the first computing platform.

15. The apparatus of claim 14, wherein obtaining the second private key, decrypting the second block using the second private key, and performing the configuration setup to enable the product to operate in accordance with the first computing platform are performed following the detection that the one or more features of the product have been activated.

16. The apparatus of claim 10, wherein the first block comprises product activation-related data.

17. The apparatus of claim 10, wherein the second block comprises a set of one or more configuration instructions for setting up the product to operate in accordance with the first computing platform.

18. The apparatus of claim 10, wherein the product and the device of the second computing platform reside at a data center of a customer that obtained the product from the provider of the product.

19. A computer program product comprising a non-transitory processor-readable storage medium having stored therein program code of one or more software programs, wherein the program code when executed by at least one processing device causes the at least one processing device to:

store, in a secure storage system, a functionality enablement file comprising at least a first block and a second block, wherein the first block is configured to activate one or more features of a product based on a user selection of the one or more features of the product, and wherein the second block is configured to perform a configuration setup to enable the product to operate in accordance with a first computing platform based on a product identity of the product, the selected one or more features of the product, configuration criteria of the product, configuration criteria of the selected one or more features of the product, and operational data criteria for the configuration setup;

send, from the secure storage system to the product, the first block for activation of the selected one or more features of the product; and in response to detection of the activation of the selected one or more features of the product, send, from the secure storage system to a device of a second computing platform, the second block to perform the configuration setup of the product by the device;

wherein the first computing platform is a cloud computing platform managed by a provider of the product and the second computing platform is an edge computing platform coupled to the product and to the cloud computing platform, and further wherein the product lacks access to the first computing platform.

20. The computer program product of claim 19, wherein:

the first block of the functionality enablement file is encrypted with a first public key of a first cryptographic key pair that also comprises a first private key corresponding to the first public key; and the second block of the functionality enablement file is encrypted with a second public key of a second cryptographic key pair that also comprises a second private key corresponding to the second public key.

* * * * *